United States Patent [19]

Korkowski

[11] Patent Number: 4,917,229
[45] Date of Patent: Apr. 17, 1990

[54] METHOD AND APPARATUS FOR STACKING PRODUCTS

[75] Inventor: James F. Korkowski, Brandon, Minn.

[73] Assignee: APV Douglas Machine Corporation, Alexandria, Minn.

[21] Appl. No.: 288,867

[22] Filed: Dec. 21, 1988

[51] Int. Cl.$^4$ ............................................. B65G 47/26
[52] U.S. Cl. .................................. 198/418.4; 414/791
[58] Field of Search ............................. 198/418, 418.4; 414/791, 790.3, 790.7

[56] References Cited

U.S. PATENT DOCUMENTS

| | | | |
|---|---|---|---|
| 3,455,085 | 7/1969 | McIntyre | 198/418.4 X |
| 3,488,693 | 1/1970 | Brinkmeier | 414/791 X |
| 3,978,571 | 9/1976 | Orlando et al. | 414/790.7 X |
| 4,307,800 | 12/1981 | Joa | 198/374 |
| 4,450,949 | 5/1984 | Buschor et al. | 198/418.4 |
| 4,569,620 | 2/1986 | Lynch | 198/405 X |
| 4,646,908 | 3/1987 | Gambetti | 198/418.4 |
| 4,668,148 | 5/1987 | Sample et al. | 414/790.7 X |

Primary Examiner—Robert J. Spar
Assistant Examiner—Cheryl L. Gastineau
Attorney, Agent, or Firm—Peterson, Wicks, Nemer & Kamrath

[57] ABSTRACT

A method and apparatus for stacking products such as trays are disclosed utilizing a rotary ferris wheel device which raises product off a conveyor and places it on a platform where it is pushed off unto additional product being conveyed on the conveyor. Specifically, an arm is rotated from a noninterfering position below the conveyor until a pivotally mounted shoe on the free end of the arm abuts the product without gripping or attachment thereto, raises the product off the conveyor, and places the product on a platform. The next product on the conveyor is allowed to be conveyed on the conveyor without interference. After the arm is rotated from under the platform into a noninterfering position below the conveyor, the product is pushed off the platform unto the product which remained on the conveyor. Thereafter, the stacked products continue to be conveyed on the conveyor. In the preferred form, the shoes of the arm are maintained in a parallel relation to the conveyor by sprockets rotatably fixed to the shoes and to the shaft forming the pivot axis for the arm, with the sprockets being in driving relation to each other by a chain extending therebetween.

18 Claims, 2 Drawing Sheets 4,917,229

METHOD AND APPARATUS FOR STACKING PRODUCTS

BACKGROUND

The present invention generally relates to packaging, and particularly to a method and apparatus for stacking products, and in the most preferred form for stacking trays.

In the shipping of products, there is often a need to stack and then shrink wrap two stacked products. One environment where such a need exists is in the food industry where products are loaded into cartons, either individually or in packs, and then the cartons are stacked together before shrink wrapping. Although stacking apparatus are currently available, they are disadvantageous for several reasons. For example, prior stackers operated at relatively slow rates of speed and particularly were unable to stack products at the rate to match the rate tat loading machines load products into cartons. Further, prior stackers were complicated in design including many moveable parts and thus are also deficient in the areas of cost, size, wear and tear, and maintenance. Thus, a need has arisen for methods and apparatus which overcome the disadvantages and deficiencies of prior stackers and which are otherwise advantageous.

SUMMARY

The present invention solves this need and other problems in the field of packaging by providing a method and apparatus for stacking products. Specifically, product is placed on a platform by abutting the bottom of the product and raising it off a conveyor. The product is then pushed unto a successive product which is advancing on the conveyor without interference. Thereafter, the stacked products continue moving on the conveyor.

Thus, it is an object of the present invention to provide a novel apparatus for stacking products.

Thus, it is an object of the present invention to provide a novel method for stacking products.

It is further an object of the present invention to provide such novel apparatus and method for stacking products which do not grip or attach to the product.

It is further an object of the present invention to provide such novel apparatus and method for stacking products which stack a large range of product sizes.

It is further an object of the present invention to provide such novel apparatus and method for stacking products of a simple nature.

It is further an object of the present invention to provide such novel apparatus and method for stacking products which stack at rapid rates.

It is further an object of the present invention to provide such a novel apparatus for stacking products including continuous rotary motion drives.

It is further an object of the present invention to provide such a novel apparatus for stacking products not requiring cam, reciprocal, or lost motion drives.

It is further an object of the present invention to provide such a novel apparatus for stacking products maximizing the use of standard, off the shelf type stock parts.

It is further an object of the present invention to provide such a novel apparatus for stacking products which is easy to fabricate and assembly.

It is further an object of the present invention to provide such a novel apparatus for stacking products including few moveable parts subject to wear.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
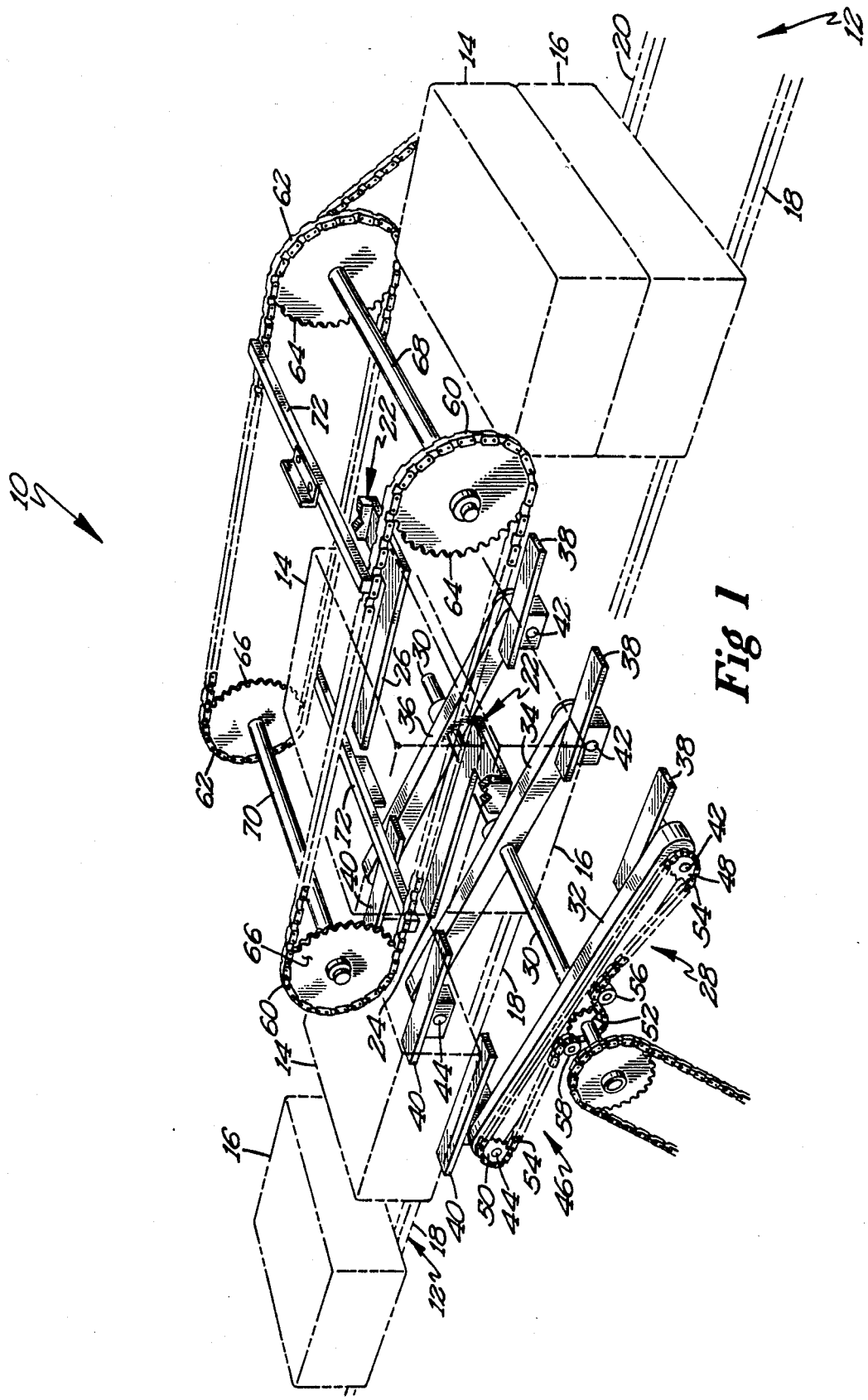
FIG. 1 shows a perspective view of an apparatus for stacking products according to the most preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "width", "height", "longitudinally", "end", "side", "above", "below", "outside", and similar terms are used herein, it should be understood that these terms have reference only to the structure shown in the drawings as it would appear to a person viewing the drawings and are utilized only to facilitate describing the invention.

DESCRIPTION

An apparatus for stacking products such as trays loaded with products according to the most preferred teachings of the present invention is shown in the drawings and generally designated 10. Apparatus 10 includes a conveyor 12 for conveying a series of spaced trays 14 and 16 along a generally straight path. In the most preferred form, conveyor 12 includes first and second endless flight chains 18 and 20 which are spaced a distance less than the width of trays 14 and 16 and which are parallel to each other, with the upper flight of chains 18 and 20 forming the generally straight path. Apparatus 10 further includes a platform 22 for receiving and holding tray 14 thereon. Platform 22 is generally parallel to and spaced above conveyor 12 a distance generally equal to but slightly greater than the height of trays 14 and 16. In the most preferred form, platform 22 is formed from first and second elongated supports 24 and 26 which are arranged parallel to each other and to chains 18 and 20 and are longitudinally aligned with chains 18 and 20 of conveyor 12.

Apparatus 10 further includes a rotary or ferris wheel device 28 for raising nonsuccessive trays 14 and 16 and in the preferred form the first tray 14 of alternate trays 14 and 16 entering apparatus 10 off the generally straight path of conveyor 12 and placing it upon platform 22. In the most preferred form, rotary device 28 includes a rotatably mounted shaft 30 which defines a pivot axis located below the generally straight path of conveyor 12 and which is driven by any suitable means and in the preferred form is rotated 360°. First, second, and third arms 32, 34, and 36 are rotatably fixed adjacent their midpoints in a parallel manner and generally perpendicular to shaft 30, with arm 34 being moveable intermediate chains 18 and 20 and supports 24 and 26 and with arms 32 and 36 being moveable on opposite sides of chains 18 and 20 and supports 24 and 26. For abutting the bottom and supporting trays 14 on the free ends of arms 32, 34, and 36, rotary device 28 further includes first and second elongated shoes 38 and 40 which are pivotally mounted to the first and second free ends of arms 32, 34, and 36 about stub shafts 42 and 44. Suitable provisions 46 are further provided to keep shoes 38 and 40 parallel to conveyor 12 and platform 22 independant of the rotatable position of arms 32, 34, and 36 of device 28. In the most preferred form, sprockets 48 and 50 are rotatably fixed to stub shafts 42 and 44 and thus to shoes 38 and 40, respectively. A sprocket 52 is rotatably fixed to shaft 30. An endless chain 54 is provided which extends from and is in driving relation with sprocket 48 to sprocket 50 and then to sprocket 52 and back to sprocket 48. Suitable idler sprockets 56 and 58 may be provided rotatably attached to arms 32, 34, and 36 on opposite sides of sprocket 52 to insure chain 54 has sufficient wrap around sprocket 52 and to act as tighteners. Rotary device 28 is positioned relative to conveyor 12 to allow unobstructed or noninterfering movement of trays 16 on conveyor 12 and to allow shoes 38 and 40 to abut and raise trays 14 from conveyor 12 for placement on platform 22.

Apparatus 10 further includes provisions for pushing tray 14 from platform 22 unto tray 16 as it is being conveyed along the generally straight path by conveyor 12. In the most preferred form, endless chains 60 and 62 are provided in driving relation between sprockets 64 and 66 rotatably fixed to rotatably mounted shafts 68 and 70, respectively. In the most preferred form, shaft 70 can be driven in any suitable manner. Chains 60 and 62 are arranged parallel to each other and to chains 18 and 20 and supports 24 and 26 and are longitudinally aligned outside of chains 18 and 20, supports 24 and 26, and trays 14 and 16 conveyed on conveyor 12. First and second flight bars 72 extend between chains 60 and 62 and are arranged to abut tray 14 located on platform 22.

Figure 2:
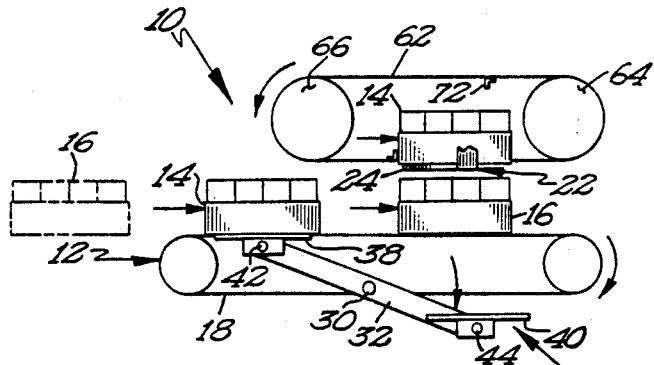
FIGS. 2-5 show diagrammatic side views of the apparatus of FIG. 1 illustrating steps of stacking products according to the preferred teachings of the present invention.
Figure 3:
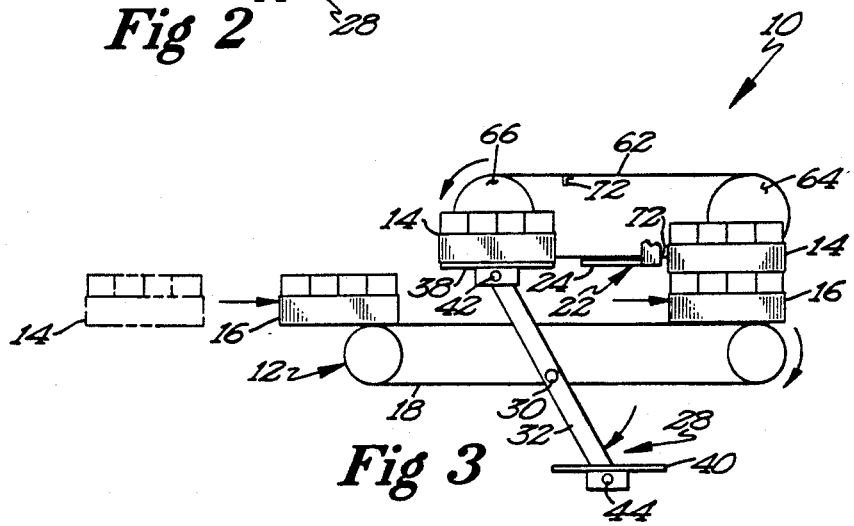
Figure 4:
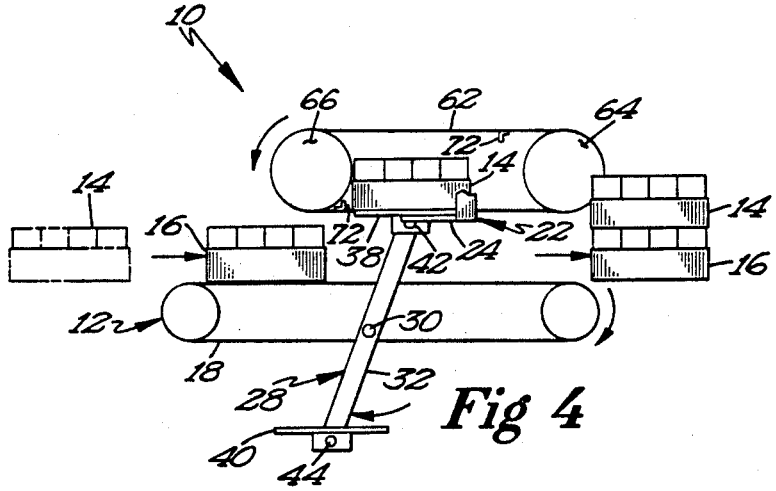
Figure 5:
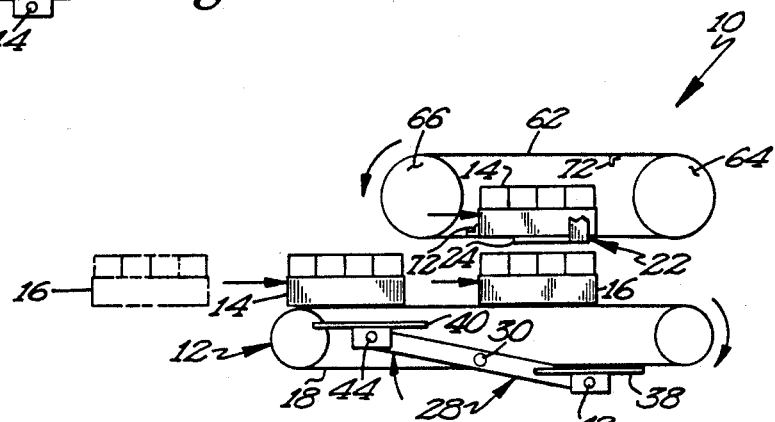

Now that the basic construction of apparatus 10 according to the preferred form of the present invention has been explained, the operation and subtle features of apparatus 10 can be set forth and appreciated. Initially, rotary device 28 is located in a first position below conveyor 12 in a noninterfering relation, with trays 14 and 16 being conveyed on conveyor 12 as best seen in FIG. 5. While trays 14 and 16 are being advanced on conveyor 12 and while rotary device 28 is moving to a second position as best seen in FIG. 4, the bottom of tray 14 is abutted by shoes 38 and raised from conveyor 12 and placed upon platform 22 by rotary device 28 as diagrammatical shown in FIGS. 2-4. Simultaneously, tray 16 is advancing on conveyor 12 behind arms 32, 34, and 36. Upon continued rotation of arms 32, 34, and 36 with shaft 30, arms 32, 34, and 36 of rotary device 28 move from its second position as best seen in FIG. 4 back to its first position below the conveying surface of conveyor 12 as best seen in FIG. 5, with shoes 40 being positioned to abut the next tray 14 after tray 16. Simultaneously, tray 16 is advancing on conveyor directly below tray 14 located on platform 22 as best seen in FIGS. 2 and 5. Flight bar 72 then abuts tray 14 and pushes it at generally the same speed as tray 16 is moving on conveyor 12 and thus pushes it from platform 22 onto tray 16 in a manner as shown in FIG. 3. Simultaneously, rotary device 28 is moving from its first position with shoes 40 abutting and raising the next tray 14 from conveyor 12 for placement on platform 22 in a similar manner as set forth for shoes 38. As best seen in FIG. 4, tray 16 with tray 14 stacked thereon by apparatus 10 continues movement on conveyor 12 for further processing as desired.

It can then be appreciated that the 360° rotation of rotary device 28 and the use of endless chains 60 and 62 according to the teachings of the present invention are believed particularly advantageous. Specifically, the driving systems of apparatus 10 can be of a simple design as continuous rotary movement is involved and particularly cam, reciprocal and lost motion drives are not needed. Further, according to the preferred teachings of the present invention, arms 32, 34, and 36 and flight bars 72 move in the same direction as trays 14 and 16 and move in noninterfering and nonobstructing positions. Thus, it is not necessary to stop or widely space trays 14 and 16 to allow rotary device 28 and flight bars 72 to move backwards out of the way and it is in fact possible to provide minimal spacing between trays 14 and 16. Furthermore, trays 14 and 16 may be advanced on conveyor 12 at rapid rates, and in the preferred form at rates to match loading machines that may run at 70 single trays per minute.

Similarly, it can be appreciated that shoes 38 and 40 and platform 22 do not grip or are in any way attached to trays 14 but rather merely abut therewith in the most preferred form of the present invention. This is believed to be advantageous for several reasons. First, gripping or attachment typically requires complicated mechanical movements to allow the gripping or attachment member to engage and disengage the product. Apparatus 10 according to the preferred teachings of the present invention merely abuts with tray 14, and thus has merely a supporting and pushing relation thereto. Thus, the complicated mechanical movements are not required in the preferred form of the present invention. Further, gripping or attachment mechanisms are typically very size dependant and thus generally are not able to be variable over a large range of product sizes. Similarly, due to mere abutment with tray 14 according to the teachings of the present invention, apparatus 10 is able to stack a relatively large range of sizes of products 14 and 16.

Further, it can be appreciated that apparatus 10 according to the teachings of the present invention is also of a particularly advantageous design. Specifically, in addition to the continuous rotary motion drives and the supporting as opposed to gripping or attaching relation to trays 14 as set forth, conveyor 12, chains 60 and 62, and flight bars 72 can be formed of standard, off the shelf type stock and specifically are not of any special design. Thus, the capital costs of molds, inventory, and the like can be reduced according to the teachings of the present invention. Particularly, the specially manufactured conveyors of prior product stackers and their attendant high costs are not required by apparatus 10 of the present invention.

Additionally, rotary device 28 according to the teachings of the present invention is formed of few moveable parts which can be easily manufactured, with arms 32, 34, and 36 and the components interrelated thereto being formed of identical components. Thus, no extraordinary fabrication costs are encountered and inventory requirements and costs are minimized.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for stacking products comprising, in combination: means for conveying the products; a platform for holding the product placed thereon, with the platform being located above the conveying means a distance greater than the height of the product; a rotary device moveable between a first position in a noninterfering relation with the products on the conveying means and a second position extending above the conveying means for abutting the bottom of the product on the conveying means, for raising the product from the conveying means, and for placing the raised product on the platform, with the rotary device comprising, in combination: a rotatable shaft defining a pivot axis; at least a first arm rotatably fixed to the shaft and having a free end; and means on the free end of the arm for supporting the product; and means for pushing the product off the platform onto a product which has been conveyed without interference on the conveying means.

2. The apparatus of claim 1 wherein the first position of the rotary device is below the conveying means.

3. The apparatus of claim 2 wherein the pivot axis of the rotary device is below the conveying means.

4. The apparatus of claim 3 wherein the arm has a second free end, with the shaft being rotatably fixed to the arm intermediate the first and second free ends of the arm, with the shaft being rotatable 360° about the pivot axis; and wherein the rotary device further comprises, in combination: means on the second free end of the arm for supporting the product.

5. The apparatus of claim 4 wherein the product supporting means comprises, in combination: a shoe pivotally mounted to the free ends of the arm; and means for keeping the shoe parallel to the conveying means.

6. The apparatus of claim 5 wherein the keeping means comprises, in combination: a first sprocket rotatably fixed to the shoe of the first end of the arm; a second sprocket rotatably fixed to the shoe of the second end of the arm; a third sprocket rotatably fixed to the rotatable shaft; and chain means in driving relation with the first, second and third sprockets.

7. The apparatus of claim 6 wherein the platform comprises, in combination: first and second supports spaced from each other, with the free ends of the arm being moveable between the first and second supports.

8. The apparatus of claim 7 wherein the conveying means comprises, in combination: first and second endless flight chains spaced from each other, with the free ends of the arm being moveable between the first and second endless flight chains.

9. The apparatus of claim 8 wherein the pushing means comprises, in combination: first and second endless chains located above the platform and spaced from each other; and a flight bar extending between the first and second endless chains for abutting with the product located on the platform.

10. The apparatus of claim 9 wherein the rotary device further comprises, in combination: second and third arms rotatably fixed to the shaft, with the second and third arms located on opposite sides of the first and second supports of the platform and the first and second endless flight chains of the conveying means.

11. The apparatus of claim 1 wherein the platform comprises, in combination: first and second supports spaced from each other, with the free end of the arm being moveable between the first and second supports.

12. The apparatus of claim 1 wherein the conveying means comprises, in combination: first and second endless flight chains spaced from each other, with the free end of the arm being moveable between the first and second endless flight chains.

13. The apparatus of claim 1 wherein the pushing means comprises, in combination: first and second endless chains located above the platform and spaced from each other; and a flight bar extending between the first and second endless chains for abutting with the product located on the platform.

14. Method of stacking products comprising the steps of:
(a) conveying the products along a generally straight path;
(b) providing a rotary device including a first arm rotatable about a pivot axis and having a free end including means for supporting the product;
(c) rotating the first arm about the pivot axis for abutting the bottom of the products with the product supporting means, raising nonsuccessive products off the generally straight path, and placing the raised products on a platform located above the products being conveyed along the generally straight path;
(d) pushing the product off the platform onto a product which has been conveyed without interference on the generally straight path; and
(e) continuing to convey the stacked products along the generally straight path.

15. The method of claim 14 wherein the step of conveying the products comprises the steps of: providing at least a first chain for conveying the products; and moving the chain along the generally straight path.

16. The method of claim 15 wherein the pivot axis of the first arm is below the generally straight path.

17. The method of claim 14 wherein the means for supporting the product comprises a shoe pivotally mounted to the free end of the arm; and wherein the method further comprises the step of keeping the shoe parallel to the generally straight path independent of the rotatable position of the arm.

18. The method of claim 14 wherein the rotary device providing step comprises the step of providing a ferris wheel device, with the first arm having a second free end including means for supporting the product, with the pivot axis located intermediate the first and second free ends of the arm; and wherein the rotating step comprises the step of rotating the first arm 360° about the pivot axis.

* * * * *